United States Patent
Palma et al.

(10) Patent No.: US 12,337,976 B2
(45) Date of Patent: Jun. 24, 2025

(54) SYSTEMS AND METHODS FOR COUPLING A STRUT TO A WING OF AN AIRCRAFT

(71) Applicant: THE BOEING COMPANY, Chicago, IL (US)

(72) Inventors: Druh Palma, Mill Creek, WA (US); Donald T. Powell, Everett, WA (US); William M. Sampedro-Thompson, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 17/979,060

(22) Filed: Nov. 2, 2022

(65) Prior Publication Data

US 2024/0140610 A1  May 2, 2024

(51) Int. Cl.
*B64D 27/40* (2024.01)

(52) U.S. Cl.
CPC ............ *B64D 27/40* (2024.01); *B64D 27/402* (2024.01)

(58) Field of Classification Search
CPC .......... B64D 27/402; B64D 27/40; B64C 3/32
See application file for complete search history.

(56) References Cited

U.S. PATENT DOCUMENTS

| | | | |
|---|---|---|---|
| 3,848,832 A * | 11/1974 | Stanley | B64D 27/18 244/54 |
| 4,560,122 A | 12/1985 | Parkinson | |
| 5,524,847 A * | 6/1996 | Brodell | B64D 29/02 60/797 |
| 6,938,855 B2 | 9/2005 | Marche | |
| 7,083,143 B2 | 8/2006 | Whitmer | |
| 7,104,306 B2 | 9/2006 | Huggins | |
| 7,350,747 B2 | 4/2008 | Machado | |
| 7,451,947 B2 | 11/2008 | Machado | |
| 8,727,268 B2 | 5/2014 | Combes | |
| 9,238,511 B2 | 1/2016 | Woolley et al. | |
| 9,862,497 B2 | 1/2018 | Ewens | |
| 10,358,226 B2 | 7/2019 | Pautis | |
| 10,583,930 B2 | 3/2020 | West | |
| 10,899,463 B2 | 1/2021 | Aten | |
| 11,084,597 B2 | 8/2021 | Pautis | |
| 11,319,079 B2 | 5/2022 | Pautis | |
| 2010/0314491 A1 | 12/2010 | Forbes | |

(Continued)

FOREIGN PATENT DOCUMENTS

| | | | |
|---|---|---|---|
| CA | 2929110 | | 5/2015 |
| CN | 201660965 U | * | 12/2010 |

(Continued)

OTHER PUBLICATIONS

Extended European Search Report for EP 23194808.4-1004, dated Mar. 6, 2024.

(Continued)

*Primary Examiner* — Ashesh Dangol
(74) *Attorney, Agent, or Firm* — Joseph M. Butscher; The Small Patent Law Group LLC

(57) ABSTRACT

A coupling system is configured to secure one or more struts to a wing of an aircraft. The coupling system includes one or more splice straps that secure the one or more struts to the wing. A method for securing one or more struts to a wing of an aircraft includes securing, by one or more splice straps, the one or more struts to the wing.

20 Claims, 8 Drawing Sheets

(56) References Cited

U.S. PATENT DOCUMENTS

| | | | |
|---|---|---|---|
| 2016/0229545 A1* | 8/2016 | Pautis | B64D 27/12 |
| 2018/0113425 A1* | 4/2018 | Nakashima | G05B 13/041 |
| 2022/0033060 A1* | 2/2022 | Behzadpour | B64C 3/32 |

FOREIGN PATENT DOCUMENTS

| | | |
|---|---|---|
| CN | 108238260 | 7/2018 |
| CN | 212373643 | 1/2021 |

OTHER PUBLICATIONS

English translation of CN 212373643.
English translation of CN 108238260.

\* cited by examiner

SYSTEMS AND METHODS FOR COUPLING A STRUT TO A WING OF AN AIRCRAFT

FIELD OF THE DISCLOSURE

Examples of the subject disclosure generally relate to systems and methods for coupling a strut to a wing of an aircraft.

BACKGROUND OF THE DISCLOSURE

Aircraft are used to transport passengers and cargo between various locations. Numerous aircraft depart from and arrive at a typical airport every day.

A typical commercial aircraft includes two wings extending from a fuselage. Each wing includes spars and ribs. In particular, a wing includes a front spar connected to a rear spar through a plurality of ribs. A spar is a beam that extends from the fuselage along a length of a wing, and resists twisting and bending forces, such as when the wing generates lift. In general, spars are the principle structural members of a wing, and support distributed loads. Ribs or bulkheads provide contour or shape to the wing.

Struts are used to connect structural components to the wings. For example, a strut can be used to connect a wing to an engine. In particular, a strut provides a load path from the engine into the wing.

As engine diameters increase to meet performance objectives, positioning of the engine relative to the wing can pose challenges in relation to other aspects of the aircraft configuration. For example, a lower surface of a larger engine extending below a wing can be closer to the ground as compared to a smaller engine. However, increased ground clearance in relation to the engine may be desired.

SUMMARY OF THE DISCLOSURE

A need exists for an improved system and method for securing an engine to a wing. Further, a need exists for a system and method for securing an engine to a wing that ensures a desired ground clearance with respect to the engine.

With those needs in mind, certain examples of the present disclosure provide a coupling system configured to secure one or more struts to a wing of an aircraft. The coupling system includes one or more splice straps that secure the one or more struts to the wing. In at least one example, the one or more splice straps are integrally formed with the one or more struts and the wing.

In at least one example, a rear surface of the one or more struts are linearly aligned with a front surface of a front spar of the wing. As a further example, an engine is secured to the one or more struts distally from the wing.

In at least one example, the one or more splice straps secure to the one or more struts and one or more ribs of the wing. In at least one example, the one or more splice straps include one or more upper splice straps extending over a first top surface of a rear end of the one or more struts and a second top surface of a front end of the one or more ribs, and one or more lower splice straps extending over a first bottom surface of the rear end of the one or more struts and a second bottom surface of the front end of the one or more ribs. As a further example, the one or more upper splice straps include a first upper splice strap and a second upper splice strap, and the one or more lower splice straps include a first lower splice strap and a second lower splice strap. As a further example, the one or more upper splice straps also include a third upper splice strap between the first upper splice strap and the second upper splice strap, and the one or more lower splice straps also include a third lower splice strap between the first lower splice strap and the second lower splice strap.

In at least one example, the one more splice straps are vertically and longitudinally aligned with the strut and the one or more ribs.

The coupling system can also include one or more fairings covering at least a portion of the one or more splice straps.

The coupling system can also include one or more mounting plates between the one or more splice straps, the one or more struts, and the wing.

The coupling system can also include one or more spanning plates configured to span across a plurality of ribs. The one or more splice straps can be coupled to the one or more spanning plates.

Certain examples of the present disclosure provide a method for securing one or more struts to a wing of an aircraft. The method includes securing, by one or more splice straps, the one or more struts to the wing.

Certain examples of the present disclosure provide an aircraft including a fuselage; a wing extending from the fuselage, wherein the wing includes a front spar and one or more ribs; one or more struts, wherein a rear surface of the one or more struts are linearly aligned with a front surface of the front spar; an engine secured to the one or more struts distally from the wing; and a coupling system securing the one or more struts to the wing, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the subject disclosure provide a coupling system and method for securing a strut (such as a strut box) to a wing of an aircraft. In at least one example, the coupling system includes splice straps that attach the strut to the wing. In at least one example, a strut can be a strut box that includes horizontal spars joined by vertical webs and/or frames. The strut box is aligned vertically with a wing spar and is integrated to the wing via splice straps and permanent fasteners. The splice straps can be parallel to strut(s), and connect to wing rib(s) and spar(s). Fairings can be used to cover portions of the wing.

In at least one example, the coupling system includes splice straps, fairings, and/or the like that are integrally formed with the strut(s) and the wing. The splice straps secured to the wing and the strut(s) by fasteners provides a fail-safe interface. Examples of the present disclosure can be used with various types of wings, such as where adequate height clearance may not be designed into the wing spars without sacrificing aerodynamic efficiency. In at least one example, the interfaces can be flat, to improve manufacturing efficiency. The splice straps can be aligned with ribs to maintain ease of wing inspection. Because the coupling system is integral with the wing, the overall wing assembly is lighter as there are fewer or no attachment fittings.

Figure 1:
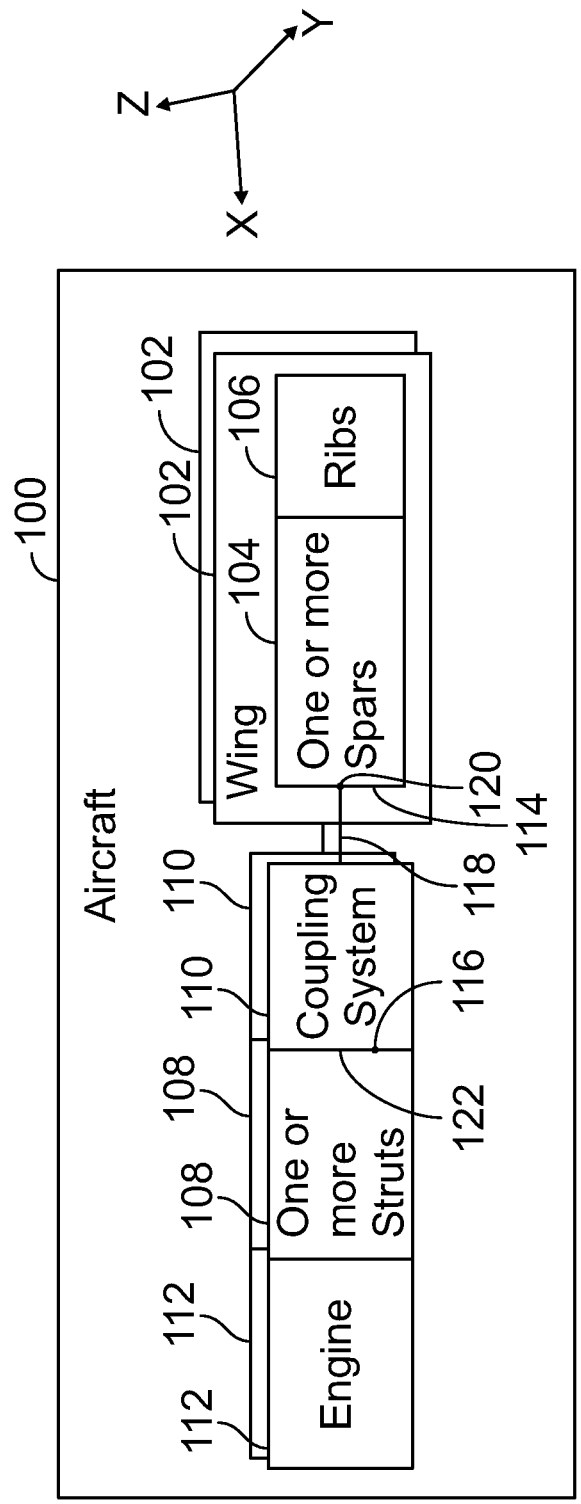
FIG. 1 illustrates a simplified block diagram of an aircraft, according to an example of the present disclosure.

FIG. 1 illustrates a simplified block diagram of an aircraft 100, according to an example of the present disclosure. The aircraft 100 includes wings 102 extending from a fuselage. The wings 102 includes one or more spars 104 and ribs 106 connected to the spars 104. For example, the wings 102 includes a front spar connected to a rear spar. A plurality of ribs 106 extends between the front spar and the rear spar.

The wing 102 is connected to one or more struts 108 through a coupling system 110. The one or more struts 108 can be a strut box, which includes spars joined by vertical webs and/or frames. The strut box can be a single strut or multiple struts. As another example, a single strut 108 can connect to the wing 102 through the coupling system 110. As another example, a plurality of struts 108, whether part of a strut box or not, can connect to the wing 102 through the coupling system 110.

The strut(s) 108 connect an engine 112 to the wing 102 through the coupling system 110. The coupling system 110 connects the spar(s) 104 and/or one or more of the ribs 106 of the wing 102 to the strut(s) 108 in an in-line fashion. For example, a front surface 114 of the spar(s) 104 is linearly aligned with a rear surface 116 of the strut(s) 108, such as along a line 118 that is parallel to an X-axis, which is orthogonal to a Y-axis and a Z-axis. In at least one example, the line 118 is a chord that extends between a center 120 of the front surface 114 of the spar(s) 104 and/or one or more of the ribs 106 and a center 122 of the rear surface 116 of the strut(s) 108. As such, at least a portion of the strut(s) 108 is directly in front of at least a portion of the spar(s) 104 and/or one or more of the ribs 106. The engine 112 is secured to the strut(s) 108 at an opposite end from the wing 102. The engine 112 connects to the strut(s) 108 distally from the wing 102. Because the coupling system 110 secures the strut(s) 108 to the wing 102 in an in-line fashion, the engine 112 can also be mounted in an in-line fashion with at least a portion of the wing 102 (such as above or below the strut(s) 108). Therefore, the engine 112 need not be secured underneath the wing 102, which, in turn, provides increased ground clearance in relation to the engine 112 and the wing 102.

The coupling system 110 is configured to secure one or more struts 108 to the wing 102 of the aircraft 100. As described herein, the coupling system 110 includes one or more splice straps that secure the one or more struts 108 to the wing 102. In at least one example, the one or more splice straps are integrally formed with the strut(s) 108 and the wing 102.

Figure 2:
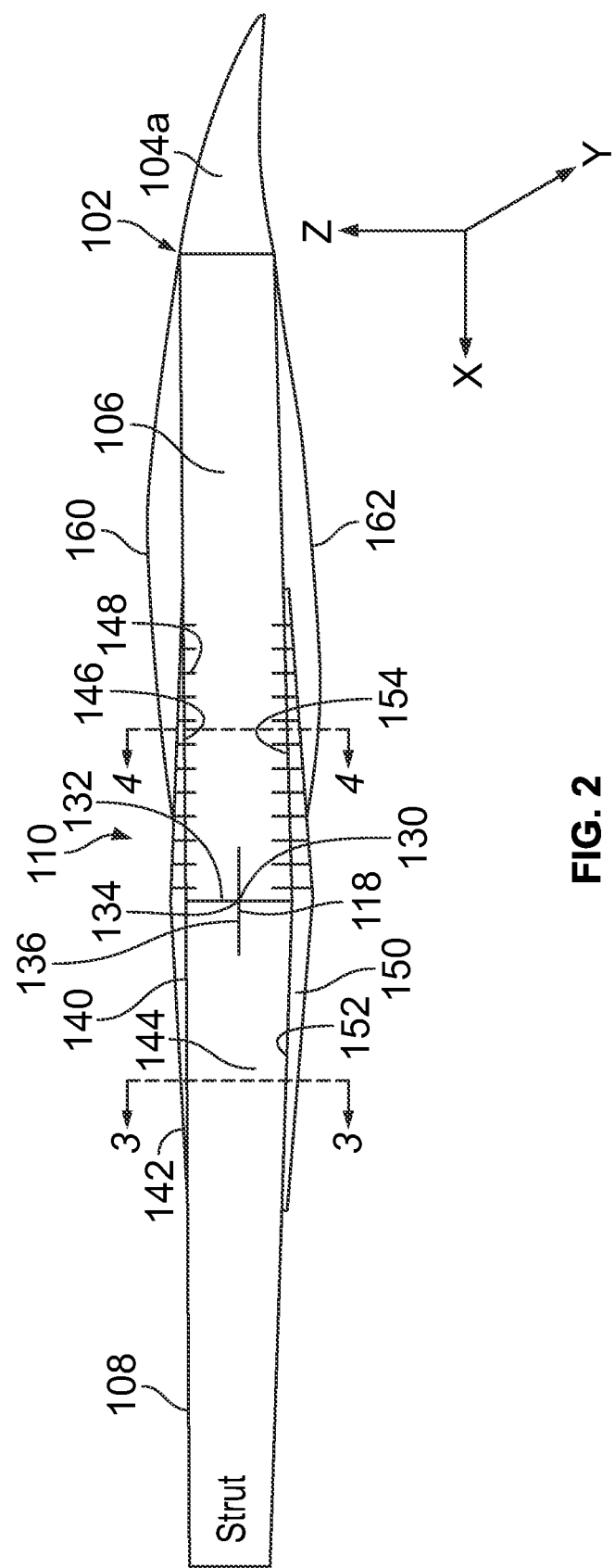
FIG. 2 illustrates a lateral view of a strut secured to a wing by a coupling system, according to an example of the present disclosure.

FIG. 2 illustrates a lateral view of a strut 108 secured to a wing 102 by a coupling system 110, according to an example of the present disclosure. FIG. 2 shows a lateral view within the wing 102. The strut 108 can be a single strut. As another example, the strut 108 includes multiple struts. As another example, the strut 108 is a strut box including multiple structural members.

The wing 102 includes a plurality of ribs 106 between a front spar (not shown in FIG. 2) and a rear spar 104a. The coupling system 110 secures the strut 108 to one or more of the ribs 106 (and optionally the front spar) in an in-line fashion. For example, the coupling system 110 connects the rib(s) 106 and/or a front spar to the strut 108, such that the line 118 between a center 130 of a front surface 132 of the rib(s) 106 and a center 134 of a rear surface 136 of the strut 108 is parallel to the X-axis (such as a horizontal axis that is parallel to a ground surface that supports landing gear of an aircraft).

The coupling system 110 includes one or more splice straps that secure the strut 108 to the rib(s) 106 (and optionally, the front spar). For example, one or more upper splice straps 140 extend over a top surface 142 of a rear end 144 of the strut 108 and a top surface 146 of a front end 148 of the rib(s) 106. Further, the coupling system 110 includes one or more lower splice straps 150 that extend over a bottom surface 152 of the rear end 144 of the strut 108, and a bottom surface 154 of the front end 148 of the rib(s) 106.

In at least one example, the splice straps 140 and 150 are longitudinal beams formed of a metal. For example, the splice straps 140 and 150 can be formed from steel, titanium, aluminum, and/or the like. Optionally, the splice straps 140 and 150 can be formed of or otherwise include composite material. The splice straps 140 and 150 provide securing straps that securely connect the strut 108 to the rib(s) 106.

The splice straps 140 and 150 are secured to the strut 108 and the rib(s) 106 (and optionally the front spar) through a plurality of fasteners (such as bolts, screws, rivets, and/or the like). For example, a first plurality of fasteners secure the splice straps 140 and 150 to the strut 108, and a second plurality of fasteners secure the splice straps 140 and 150 to the rib(s) 106 (and optionally the front spar). Adhesives can also be used to secure the splice straps 140 and 150 to the rib(s) 106, front spar, and the strut 108.

In at least one example, an upper fairing 160 is secured over the top surface 146 of the rib(s) 106. At least a portion of the upper splice strap 140 can be covered by a least a portion of the upper fairing 160. Further, a lower fairing 162 is secured over a bottom surface 154 of the rib(s) 106. At least a portion of the lower splice strap 150 can be covered by lower fairing 162. Optionally, the wing 102 may not include the upper fairing 160 and/or the lower fairing 162.

Figure 3:
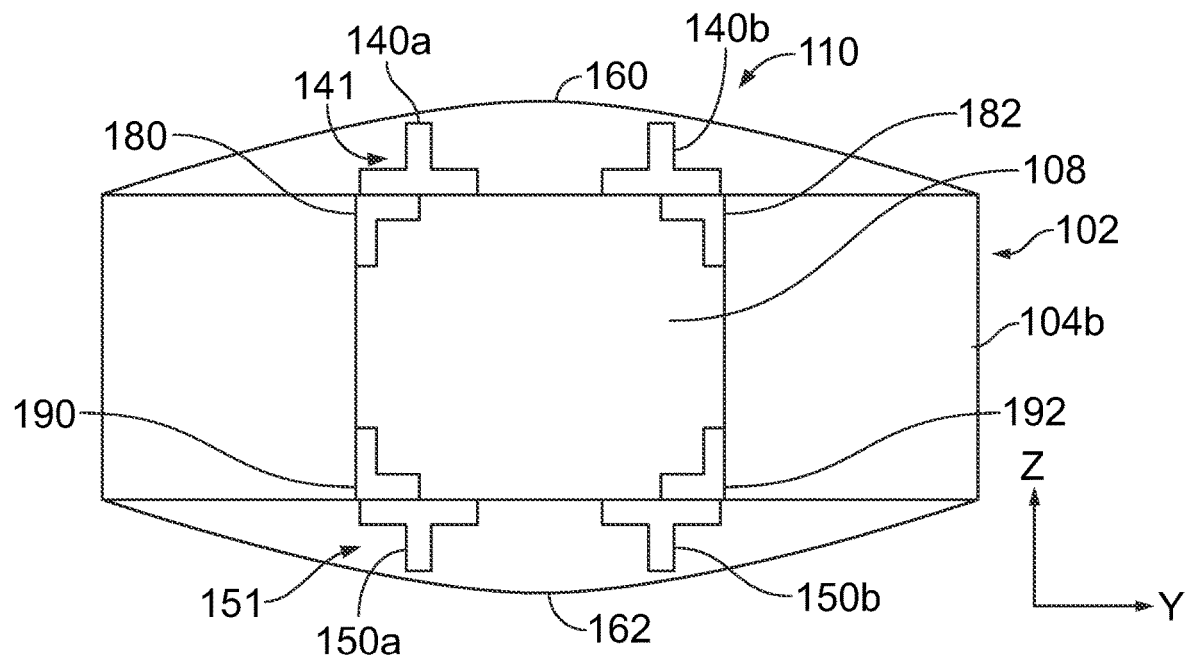
FIG. 3 illustrates a cross-sectional view of the coupling system securing the strut to the wing through line 3-3 of FIG. 2.

FIG. 3 illustrates a cross-sectional view of the coupling system 110 securing the strut 108 to the wing 102 through line 3-3 of FIG. 2. In at least one example, a first upper splice strap 140a is secured to a first upper corner surface 180 of the strut 108, and a second upper splice strap 140b is secured to a second upper corner surface 182 (opposite from the first upper corner surface 180) of the strut 108. The first upper splice strap 140a and the second upper splice strap 140b are spaced apart from one another, and are secured to the strut 108 through fasteners (such as bolts, screws, etc.), adhesives, and/or the like.

Similarly, a first lower splice strap 150a is secured to a first lower corner surface 190 of the strut 108, and a second lower splice strap 150b is secured to a second lower corner surface 192 (opposite from the first lower corner surface 190) of the strut 108. The first lower splice strap 150a and the second lower splice strap 150b are spaced apart from one another, and are secured to the strut 108 through fasteners, adhesives, and/or the like.

As shown, the splice straps 140a, 140b, 150a, and 150b are vertically and longitudinally aligned with the strut 108 in relation to the Z-axis. For example, at least portions of the splice straps are aligned over or under at least a portion of the length of the strut 108. The splice straps 140a, 140b, 150a, and 150b can be parallel with the strut 108. That is, front ends 141 of the splice straps 140a and 140b are secured directly over portions of the strut 108, and front ends 151 of the splice straps 150a and 150b are secured directly below portions of the strut 108. In this manner, the front ends 141 of the splice straps 140a and 140b and the front ends 151 of the splice straps 150a and 150b are longitudinally aligned with the strut 108. Splice straps above and below the strut 108 and the wing 102 provide reliable and consistent securing force on opposite surfaces (such as top and bottom) of the strut 108 and the wing 102.

Figure 4:
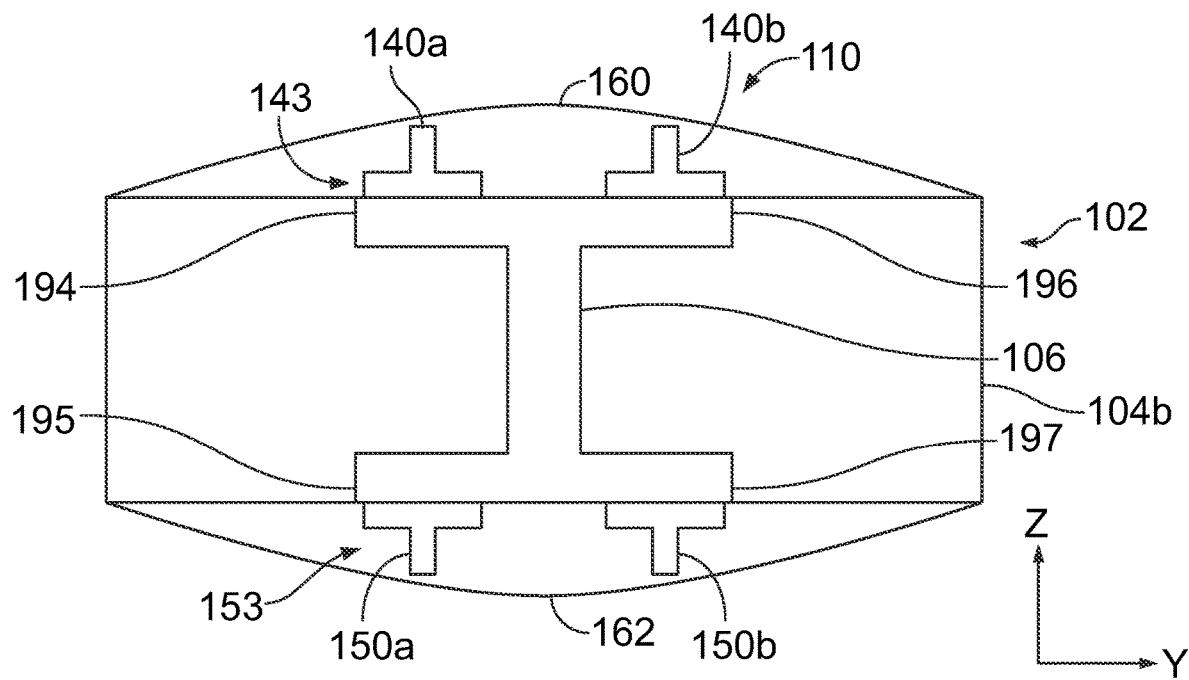
FIG. 4 illustrates a cross-sectional view of the coupling system securing to a rib of the wing through line 4-4 of FIG. 2.

FIG. 4 illustrates a cross-sectional view of the coupling system 110 securing to the rib 106 of the wing 102 through line 4-4 of FIG. 2. In at least one example, the first upper splice strap 140a is secured to a first upper corner surface 194 of the rib 106, and the second upper splice strap 140b is secured to a second upper corner surface 196 (opposite from the first upper corner surface 194) of the rib 106. The first upper splice strap 140a and the second upper splice strap 140b are spaced apart from one another, and are secured to the rib 106 through fasteners (such as bolts, screws, etc.), adhesives, and/or the like.

Similarly, the first lower splice strap 150a is secured to a first lower corner surface 195 of the rib 106, and the second lower splice strap 150b is secured to a second lower corner surface 197 (opposite from the first lower corner surface 195) of the rib 106. The first lower splice strap 150a and the second lower splice strap 150b are spaced apart from one another, and are secured to the rib 106 through fasteners, adhesives, and/or the like.

As shown, the splice straps 140a, 140b, 150a, and 150b are vertically and longitudinally aligned with the rib 106 in relation to the Z-axis. For example, at least portions of the splice straps are aligned over or under at least a portion of the length of the rib 106. The splice straps 140a, 140b, 150a, and 150b can be parallel with the rib 106. That is, rear ends 144 of the splice straps 140a and 140b are secured directly over portions of the rib 106, and rear ends 153 of the splice straps 150a and 150b are secured directly below portions of the rib 106. In this manner, the rear ends 144 of the splice straps 140a and 140b and the rear ends 153 of the splice straps 150a and 150b are longitudinally aligned with the rib 106.

Referring to FIGS. 2-4, the wing 102 includes the front spar 104b, which is secured to the rib 106. For example, the rib 106 can extend between the front spar 104b and the rear spar 104a. The strut 108 is in front of the front spar 104b. In at least one example, the splice straps 140a, 140b, 150a, and 150b can also secure to the front spar 104b, such as through one or more fasteners, adhesives, and/or the like. Optionally, the splice straps 140a, 140b, 150a, and 150b may not directly secure to the front spar 104b.

The splice straps 140a, 140b, 150a, and 150b span between the strut 108 and the rib 106, thereby securing the strut 108 to the rib 106. The splice straps 140a, 140b, 150a, and 150b secure the strut 108 to the rib 106 without separate and distinct mounting assemblies. In this manner, the splice straps 140a, 140b, 150a, and 150b integrally connect the wing 102 to the strut 108.

Figure 5:
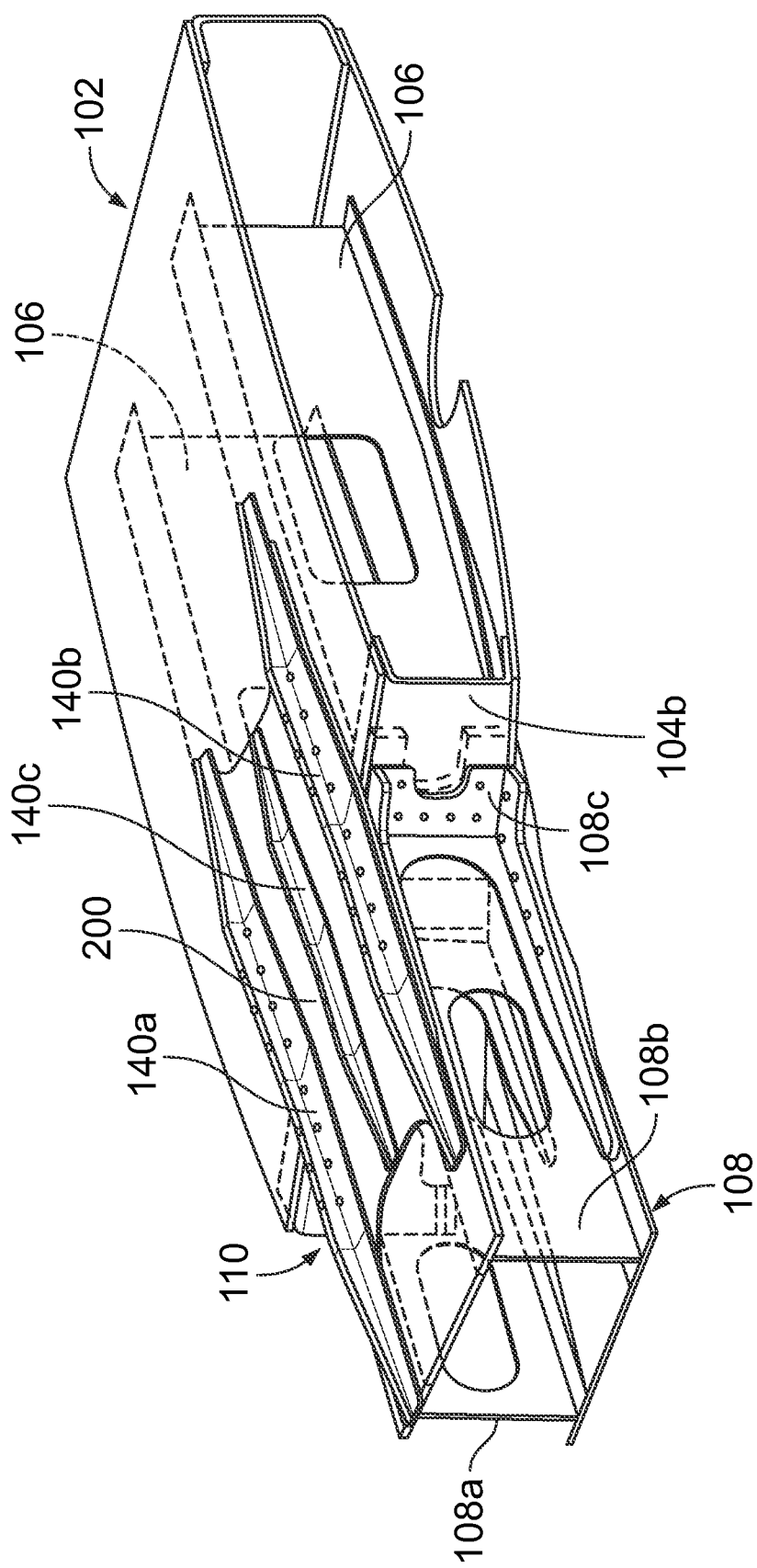
FIG. 5 illustrates an isometric top view of a coupling system securing a strut to a wing, according to an example of the present disclosure.
Figure 6:
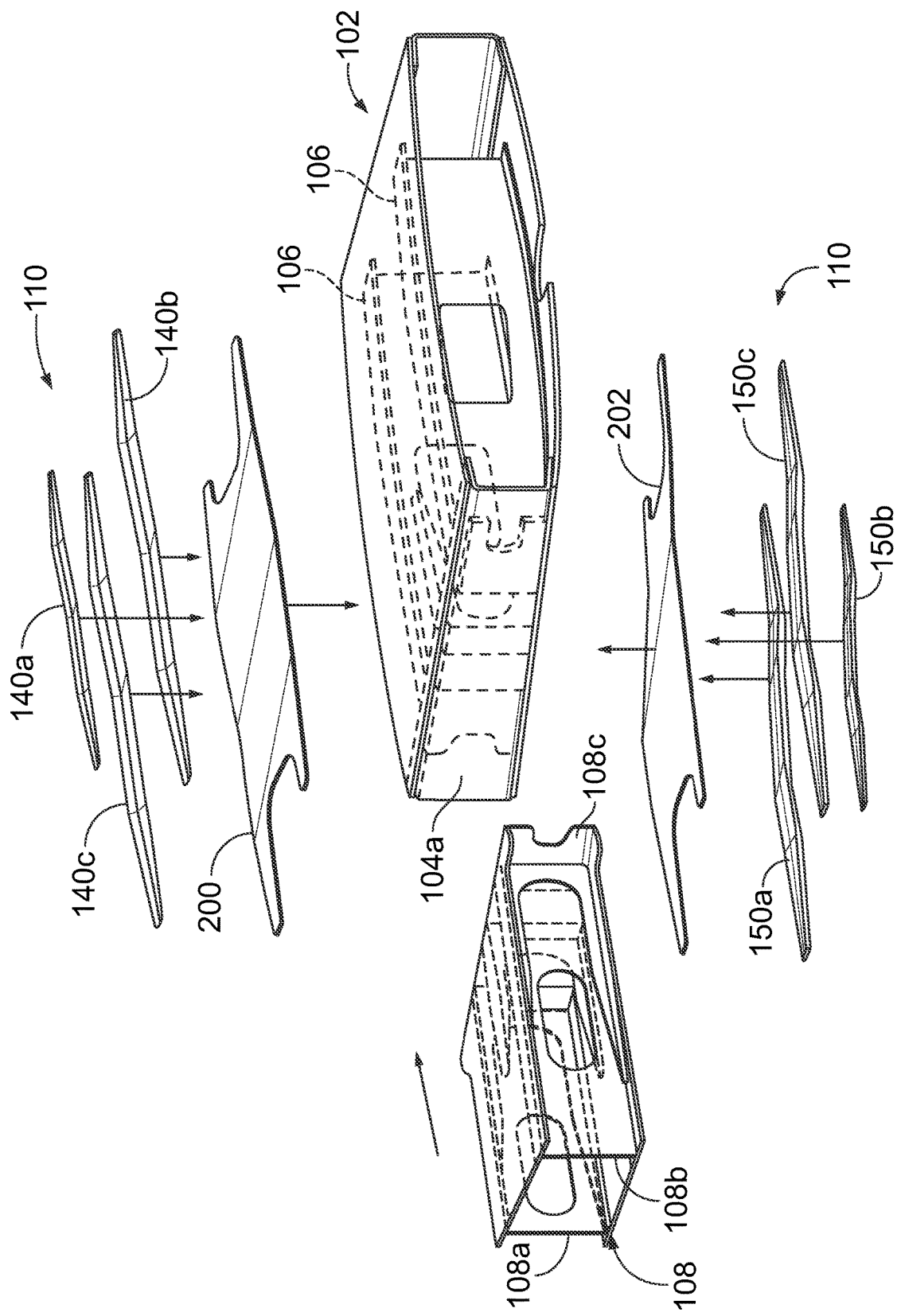
FIG. 6 illustrates an exploded isometric view the coupling system of FIG. 5.
Figure 7:
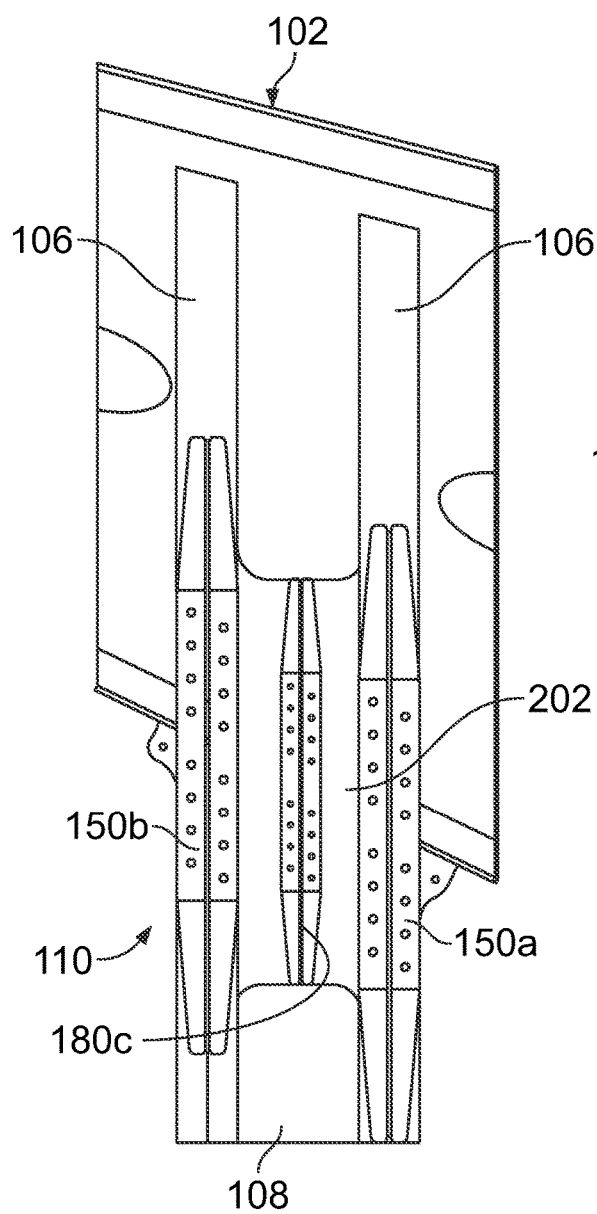
FIG. 7 illustrates a bottom view of the coupling system of FIG. 5 securing the strut to the wing.
Figure 8:
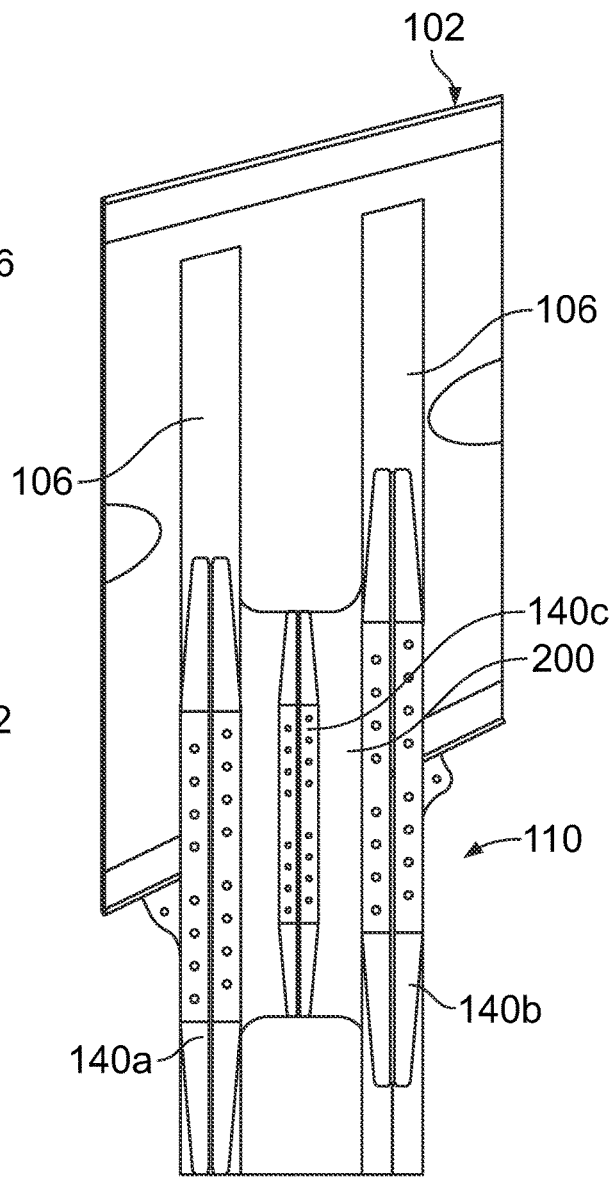
FIG. 8 illustrates a top view of the coupling system of FIG. 5 securing the strut to the wing.

FIG. 5 illustrates an isometric top view of a coupling system 110 securing a strut 108 to a wing 102, according to an example of the present disclosure. FIG. 6 illustrates an exploded isometric view the coupling system 110 of FIG. 5. FIG. 7 illustrates a bottom view of the coupling system 110 of FIG. 5 securing the strut 108 to the wing 102. FIG. 8 illustrates a top view of the coupling system 110 of FIG. 5 securing the strut 108 to the wing 102.

Referring to FIGS. 5-8, the strut 108 is a strut box including a plurality of strut frames or members 108a and 108b. The strut 108 can also include lateral braces 108c secured to outer lateral surfaces and a front surface of a front spar 104b of the wing 102. The lateral braces 108c are on opposite sides of the strut 108 and are configured to provide support that resists twisting forces, for example.

The coupling system 110 includes a plurality of splice straps. For example, the coupling system 110 includes upper splice straps 140a, 140b, and 140c, which is between the lower splice strap 140a and 140b. The intermediate splice strap 140c provides redundant support. For example, the intermediate splice strap 140c provides additional securing force, and also resists bending forces that may be exerted into and/or onto the coupling system 110 between the splice straps 140a and 140b. The coupling system 110 also include lower splice straps 150a, 150b, and 150c, which is between the lower splice straps 150a and 150b. The intermediate splice strap 150c provides redundant support. For example, the intermediate splice strap 150c provides additional securing force, and also resists bending forces that may be exerted into and/or onto the coupling system 110 between the splice straps 150a and 150b.

In at least one example, the coupling system 110 also includes an upper mounting plate 200 that spans over top surfaces of the strut 108 and the wing 102. The upper mounting plate 200 can be a flattened panel that conforms to and over portions of the top surfaces of the strut 108 and the wing 102. The upper mounting plate 200 provides a base over which the upper splice straps 140a, 140b and 140c securely mount to the strut 108 and the wing 102.

Similarly, the coupling system 110 also includes a lower mounting plate 202 that spans over bottom surfaces of the strut 108 and the wing 102. The lower mounting plate 202 can be a flattened panel that conforms to and over portions of the bottom surfaces of the strut 108 and the wing 102. The lower mounting plate 200 provides a base over which the lower splice straps 140a, 140b and 140c securely mount to the strut 108 and the wing 102.

The upper mounting plate 200 and the lower mounting plate 202 securely, consistently, and uniformly secure the upper splice straps 140a, 140b, and 140c and the lower splice straps 150a, 150b, and 150c to the strut 108 and the wing 102. Optionally, the coupling system 110 may not include the upper mounting plate and/or the lower mounting plate 202.

As shown in FIG. 7, each of the splice straps 150a and 150b is secured directly under a respective rib 106. Further, as shown in FIG. 8, each of the splice straps 140a and 150b is secured directly over a respective rib 106. The splice straps 140a, 140b, 150a, and 150b can be sized and shaped the same The splice straps 140c and 150c can be sized and shaped the same, but differently than the splice straps 140a, 140b, 150a, and 150b. Optionally, each of the splice straps can be sized and shaped differently from one another. As another example, all of the splice straps can be sized and shaped the same. The coupling system 110 can include more or less splice straps that shown. For example, the coupling system 110 can include four or more upper splice straps and/or four or more lower splice straps. As another example, the coupling system 110 can include a single upper splice strap and/or a single lower splice strap.

Figure 9:
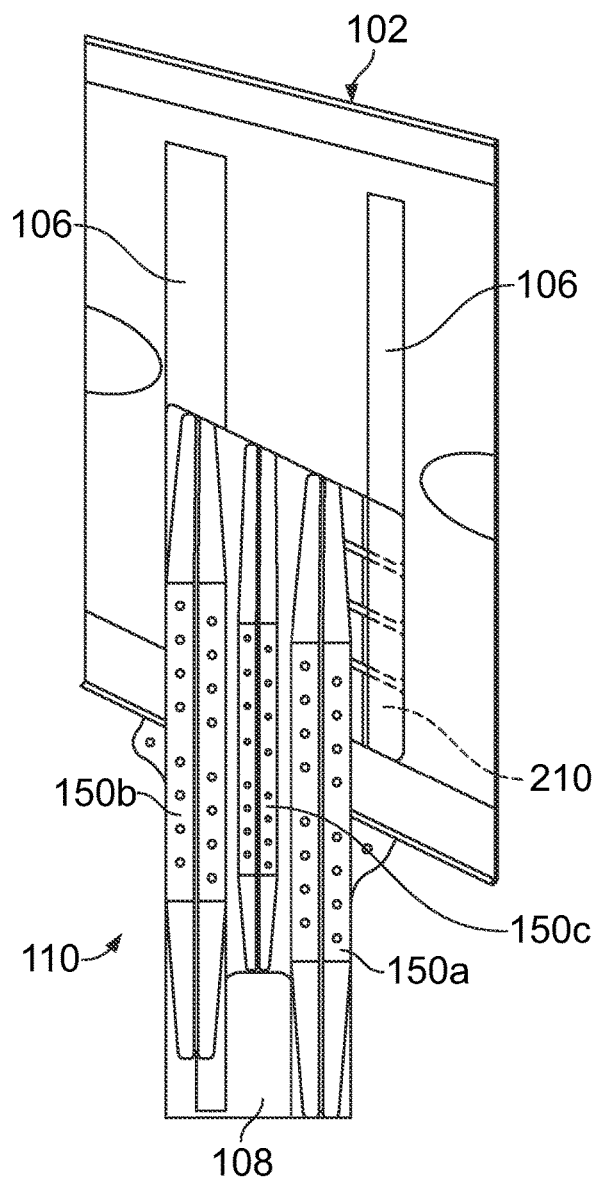
FIG. 9 illustrates a bottom view of a coupling system securing the strut to the wing, according to an example of the present disclosure.
Figure 10:
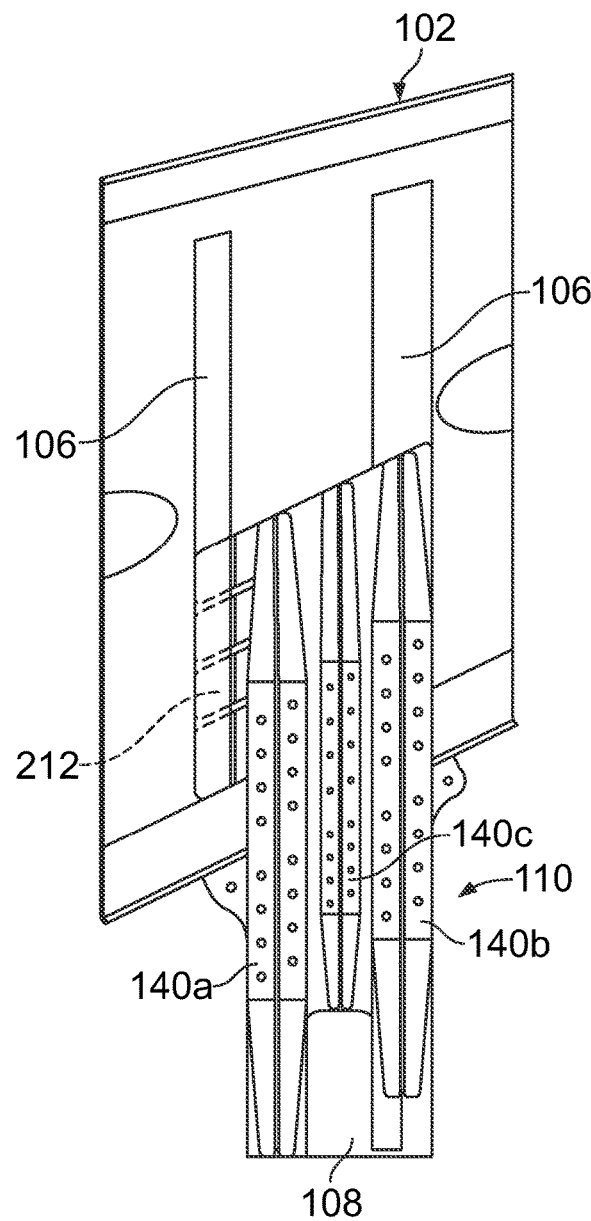
FIG. 10 illustrates a top view of the coupling system of FIG. 9 securing the strut to the wing.

FIG. 9 illustrates a bottom view of a coupling system 110 securing the strut 108 to the wing 102, according to an example of the present disclosure. FIG. 10 illustrates a top view of the coupling system 110 of FIG. 9 securing the strut 108 to the wing 102. Referring to FIGS. 9 and 10, the coupling system 110 can include a lower spanning plate 210 and an upper spanning plate 212. The lower spanning plate 210 is used to span across and below spaced-apart ribs 106, to ensure that the lower splice straps 150a-c, which can be secured to a mounting plate, exert consistent securing force in relation to the neighboring ribs 106. Similarly, the upper spanning plate 212 is used to span across and above the ribs 106, to ensure that the upper splice straps 140a-c, which can be secured to a mounting plate, exert consistent securing force in relation to the neighboring ribs 106. Optionally, the spanning plates 210 and 212 can be used in place of (or in addition to) the mounting plates.

Figure 11:
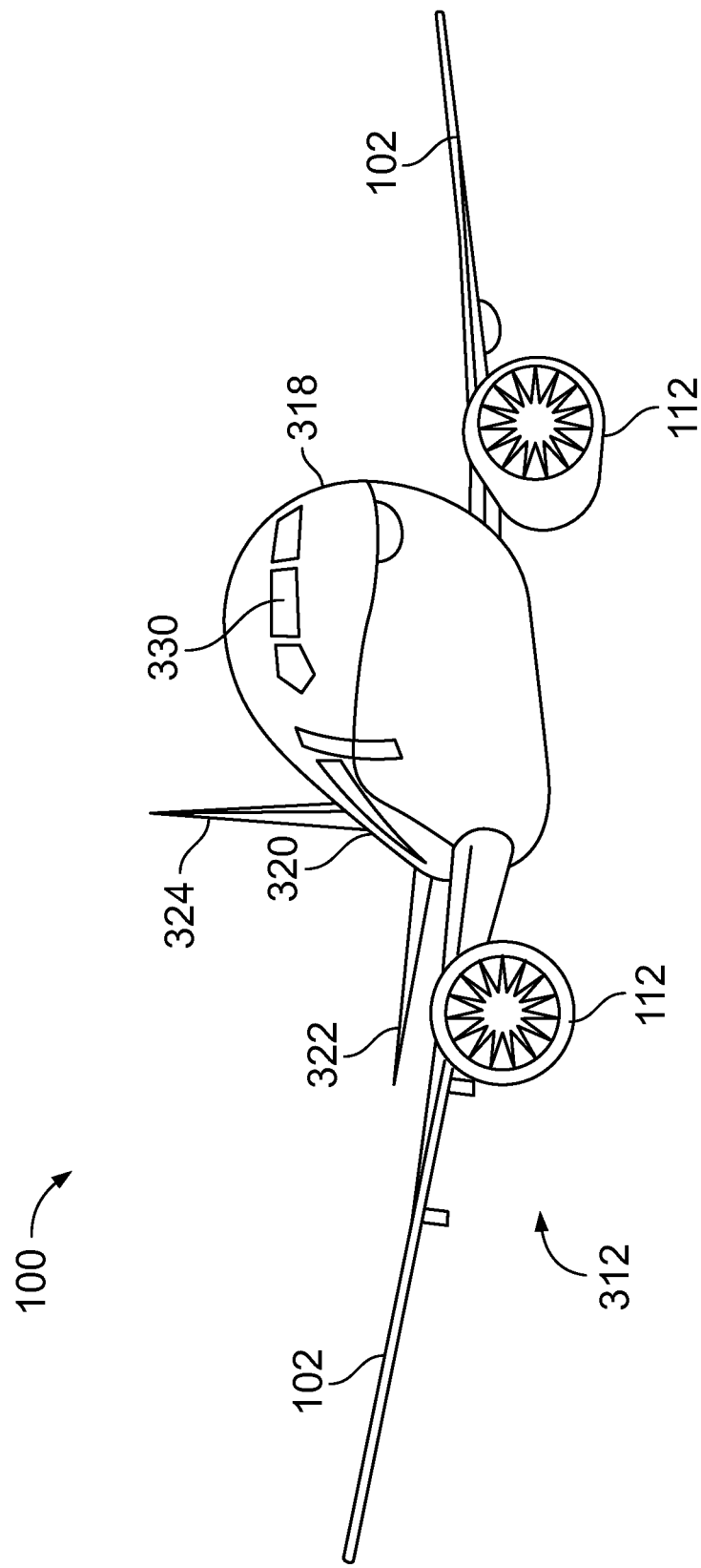
FIG. 11 illustrates a perspective front view of an aircraft, according to an example of the subject disclosure.

FIG. 11 illustrates a perspective front view of an aircraft 100, according to an example of the subject disclosure. The aircraft 100 includes a propulsion system 312 that includes engines 112, for example. Optionally, the propulsion system 312 may include more engines 112 than shown. The engines 112 are carried by wings 102 of the aircraft 100. Referring to FIGS. 1-11, the coupling systems 110 secure the struts 108 to the wings 102, and the engines 112 are secured to the struts 108 opposite from the wings 102. In other examples, the engines 112 may be carried by a fuselage 318 and/or an empennage 320, and the coupling systems 110 can secure the engines thereto. The empennage 320 may also support horizontal stabilizers 322 and a vertical stabilizer 324. The fuselage 318 of the aircraft 100 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. FIG. 11 shows an example of an aircraft 100. It is to be understood that the aircraft 100 can be sized, shaped, and configured differently than shown in FIG. 11.

Further, the disclosure comprises examples according to the following clauses:

Clause 1. A coupling system configured to secure one or more struts to a wing of an aircraft, the coupling system comprising:
one or more splice straps that secure the one or more struts to the wing.

Clause 2. The coupling system of Clause 1, wherein the one or more splice straps are integrally formed with the one or more struts and the wing.

Clause 3. The coupling system of Clauses 1 or 2, wherein a rear surface of the one or more struts are linearly aligned with a front surface of a front spar of the wing.

Clause 4. The coupling system of Clause 3, wherein an engine is secured to the one or more struts distally from the wing.

Clause 5. The coupling system of any of Clauses 1-4, wherein the one or more splice straps secure to the one or more struts and one or more ribs of the wing.

Clause 6. The coupling system of Clause 5, wherein the one or more splice straps comprise:
one or more upper splice straps extending over a first top surface of a rear end of the one or more struts and a second top surface of a front end of the one or more ribs; and
one or more lower splice straps extending over a first bottom surface of the rear end of the one or more struts and a second bottom surface of the front end of the one or more ribs.

Clause 7. The coupling system of Clause 6, wherein the one or more upper splice straps comprise a first upper splice strap and a second upper splice strap, and wherein the one or more lower splice straps comprise a first lower splice strap and a second lower splice strap.

Clause 8. The coupling system of Clause 7, wherein the one or more upper splice straps further comprise a third upper splice strap between the first upper splice strap and the second upper splice strap, and wherein the one or more lower splice straps further comprise a third lower splice strap between the first lower splice strap and the second lower splice strap.

Clause 9. The coupling system of any of Clauses 5-8, wherein the one more splice straps are vertically and longitudinally aligned with the strut and the one or more ribs.

Clause 10. The coupling system of any of Clauses 1-9, further comprising one or more fairings covering at least a portion of the one or more splice straps.

Clause 11. The coupling system of any of Clauses 1-10, further comprising one or more mounting plates between the one or more splice straps, the one or more struts, and the wing.

Clause 12. The coupling system of any of Clauses 1-11, further comprising one or more spanning plates configured to span across a plurality of ribs, wherein the one or more splice straps are coupled to the one or more spanning plates.

Clause 13. A method for securing one or more struts to a wing of an aircraft, the method comprising:
securing, by one or more splice straps, the one or more struts to the wing.

Clause 14. The method of Clause 13, wherein said securing comprises integrally forming the one or more splice straps with the one or more struts and the wing.

Clause 15. The method of Clauses 13 or 14, wherein said securing comprises securing the one or more splice straps to the one or more struts and one or more ribs of the wing.

Clause 16. The method of Clause 15, wherein the one or more splice straps comprise:
one or more upper splice straps extending over a first top surface of a rear end of the one or more struts and a second top surface of a front end of the one or more ribs; and one or more lower splice straps extending over a first bottom surface of the rear end of the one or more struts and a second bottom surface of the front end of the one or more ribs.

Clause 17. The method of any Clauses 15 or 16, wherein said securing further comprises vertically and longitudinally aligning the one more splice straps with the strut and the one or more ribs.

Clause 18. An aircraft comprising;

a fuselage;

a wing extending from the fuselage, wherein the wing comprises a front spar and one or more ribs;

one or more struts, wherein a rear surface of the one or more struts are linearly aligned with a front surface of the front spar;

an engine secured to the one or more struts distally from the wing; and a coupling system securing the one or more struts to the wing, the coupling system comprising:

one or more splice straps that secure the one or more struts to the wing, wherein the one or more splice straps are integrally formed with the one or more struts and the wing, wherein the one or more splice straps secure to the one or more struts and the one or more ribs, and wherein the one more splice straps are vertically and longitudinally aligned with the strut and the one or more ribs.

Clause 19. The aircraft of Clause 18, wherein the one or more splice straps comprise:

one or more upper splice straps extending over a first top surface of a rear end of the one or more struts and a second top surface of a front end of the one or more ribs; and one or more lower splice straps extending over a first bottom surface of the rear end of the one or more struts and a second bottom surface of the front end of the one or more ribs.

Clause 20. The aircraft of Clause 19, wherein the one or more upper splice straps comprise:

a first upper splice strap;

a second upper splice strap;

a third upper splice strap between the first upper splice strap and the second upper splice strap;

a first lower splice strap;

a second lower splice strap; and a third lower splice strap between the first lower splice strap and the second lower splice strap.

As described herein, examples of the subject disclosure provide an improved system and method for securing an engine to a wing. Further, examples of the present disclosure provide a system and method for securing an engine to a wing that ensures a desired ground clearance with respect to the engine.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:

a fuselage;

a wing extending from the fuselage, wherein the wing comprises a front spar and one or more ribs;

a strut, wherein a rear surface of the strut is linearly aligned with a front surface of the front spar;

an engine secured to the strut and positioned distally from the wing; and a coupling system securing the strut to the wing, the coupling system comprising:

splice straps that secure the strut to the wing, wherein the splice straps are integrally formed with the strut and the wing, wherein the splice straps secure to both the strut and the one or more ribs, and wherein the splice straps are vertically and longitudinally aligned with the strut and the one or more ribs, wherein the splice straps comprise:

upper splice straps comprising a first upper splice strap, a second upper splice strap, and a third upper splice strap between the first upper splice strap and the second upper splice strap, wherein the first upper splice strap extends over a first top surface of a rear end of the strut and a second top surface of a front end of a first rib of the one or more ribs, and the second upper splice strap extends over the first top surface of the rear end of the strut and a second top surface of a front end of a second rib of the one or more ribs; and lower splice straps comprising a first lower splice strap, a second lower splice strap, and a third lower splice strap between the first lower splice strap and the second lower splice strap, wherein the first lower splice strap extends over a first bottom surface of the rear end of the strut and a second bottom surface of the front end of the first rib of the one or more ribs, and the second lower splice strap extends over the first bottom surface of the rear end of the strut and a second bottom surface of the front end of the second rib of the one or more ribs; and an upper mounting plate spanning over the strut and the wing, wherein the upper mounting plate provides a base on which the first upper splice strap, the second upper splice strap, and the third upper splice strap securely mount to the strut and the wing, wherein the first upper splice strap is secured directly over the first rib, and wherein the second upper splice strap is secured directly over the second rib; and a lower mounting plate spanning below the strut and the wing, wherein the lower mounting plate provides a base on which the first lower splice strap, the second lower splice strap, and the third lower splice strap securely mount to the strut and the wing, wherein the first lower splice strap is secured directly under the first rib, and wherein the second lower splice strap is secured directly under the second rib.

2. The aircraft of claim 1, wherein the coupling system, further comprises:

a first lateral brace secured to a first outer lateral surface of the strut and the front spar of the wing; and a second lateral brace secured to a second outer lateral surface of the strut and the front spar of the wing, wherein the second outer lateral surface is opposite from the first lateral surface.

3. The aircraft of claim 1, further comprising one or more fairings covering at least a portion of the splice straps.

4. The aircraft of claim 1, further comprising one or more spanning plates configured to span across the one or more ribs, wherein the splice straps are coupled to the one or more spanning plates.

5. A coupling system configured to secure a strut to a wing of an aircraft, the coupling system comprising:

splice straps configured to secure the strut to the wing, wherein the splice straps are configured to vertically and longitudinally align with the strut and one or more ribs, wherein the splice straps comprise:

upper splice straps comprising a first upper splice strap, a second upper splice strap, and a third upper splice strap between the first upper splice strap and the second upper splice strap, wherein the first upper splice strap extends over a first top surface of a rear end of the strut and a second top surface of a front end of a first rib of the one or more ribs, and the second upper splice strap extends over the first top surface of the rear end of the strut and a second top surface of a front end of a second rib of the one or more ribs; and lower splice straps comprising a first lower splice strap, a second lower splice strap, and a third lower splice strap between the first lower splice strap and the second lower splice strap, wherein the first lower splice strap extends over a first bottom surface of the rear end of the strut and a second bottom surface of the front end of the first rib of the one or more ribs, and the second lower splice strap extends over the first bottom surface of the rear end of the strut and a second bottom surface of the front end of the second rib of the one or more ribs; and an upper mounting plate configured to span over the strut and the wing, wherein the upper mounting plate is configured to provide a base on which the first upper splice strap, the second upper splice strap, and the third upper splice strap securely mount to the strut and the wing, wherein the first upper splice strap is configured to be secured directly over the first rib, and wherein the second upper splice strap is configured to be secured directly over the second rib; and a lower mounting plate configured to span below the strut and the wing, wherein the lower mounting plate is configured to provide a base on which the first lower splice strap, the second lower splice strap, and the third lower splice strap securely mount to the strut and the wing, wherein the first lower splice strap is configured to be secured directly under the first rib, and wherein the second lower splice strap is configured to be secured directly under the second rib.

6. The coupling system of claim 5, wherein the splice straps are integrally formed with the strut and the wing.

7. The coupling system of claim 5, wherein a rear surface of the strut is linearly aligned with a front surface of a front spar of the wing.

8. The coupling system of claim 7, wherein an engine is secured to the strut and positioned distally from the wing.

9. The coupling system of claim 5, wherein the splice straps secure to both the strut and the one or more ribs of the wing.

10. The coupling system of claim 5, further comprising one or more fairings covering at least a portion of the splice straps.

11. The coupling system of claim 5, further comprising one or more spanning plates configured to span across the one or more ribs, wherein the splice straps are coupled to the one or more spanning plates.

12. The coupling system of claim 5, further comprising:

a first lateral brace configured to secure to a first outer lateral surface of the strut and a front spar of the wing; and a second lateral brace configured to secure to a second outer lateral surface of the strut and the front spar of the wing, wherein the second outer lateral surface is opposite from the first lateral surface.

13. A method comprising:

securing a strut to a wing of an aircraft by splice straps; and vertically and longitudinally aligning the splice straps with the strut and one or more ribs, wherein the splice straps comprise:

upper splice straps comprising a first upper splice strap, a second upper splice strap, and a third upper splice strap between the first upper splice strap and the second upper splice strap, wherein the first upper splice strap extends over a first top surface of a rear end of the strut and a second top surface of a front end of a first rib of the one or more ribs, and the second upper splice strap extends over the first top surface of the rear end of the strut and a second top surface of a front end of a second rib of the one or more ribs; and lower splice straps comprising a first lower splice strap, a second lower splice strap, and a third lower splice strap between the first lower splice strap and the second lower splice strap, wherein the first lower splice strap extends over a first bottom surface of the rear end of the strut and a second bottom surface of the front end of the first rib of the one or more ribs, and the second lower splice strap extends over the first bottom surface of the rear end of the strut and a second bottom surface of the front end of the second rib of the one or more ribs; and an upper mounting plate spanning over the strut and the wing, wherein the upper mounting plate provides a base on which the first upper splice strap, the second upper splice strap, and the third upper splice strap securely mount to the strut and the wing, wherein the first upper splice strap is secured directly over the first rib, and wherein the second upper splice strap is secured directly over the second rib; and a lower mounting plate spanning below the strut and the wing, wherein the lower mounting plate provides a base on which the first lower splice strap, the second lower splice strap, and the third lower splice strap securely mount to the strut and the wing, wherein the first lower splice strap is secured directly under the first rib, and wherein the second lower splice strap is secured directly under the second rib.

14. The method of claim 13, further comprising integrally forming the splice straps with the strut and the wing.

15. The method of claim 13, further comprising linearly aligning a rear surface of the strut with a front surface of a front spar of the wing.

16. The method of claim 13, securing an engine to the strut and positioning the engine distally from the wing.

17. The method of claim 13, further comprising securing the splice straps to both the strut and the one or more ribs.

18. The method of claim 13, further comprising covering at least a portion of the splice straps with one or more fairings.

19. The method of claim 13, further comprising:
spanning across the one or more ribs with one or more spanning plates; and
coupling the splice straps to the one or more spanning plates.

20. The method of claim 13, further comprising:
securing a first lateral brace to a first outer lateral surface of the strut and a front spar of the wing; and
securing a second lateral brace to a second outer lateral surface of the strut and the front spar of the wing, wherein the second outer lateral surface is opposite from the first lateral surface.

* * * * *